United States Patent [19]

Ogawa et al.

[11] 4,276,208

[45] Jun. 30, 1981

[54] GLASS FIBER-REINFORCED THERMOPLASTIC POLYESTER COMPOSITION

[75] Inventors: Yoshinari Ogawa; Teruhisa Fukumoto; Kohichi Sakai, all of Sagamihara, Japan

[73] Assignee: Teijin Limited, Osaka, Japan

[21] Appl. No.: 82,970

[22] Filed: Oct. 9, 1979

[30] Foreign Application Priority Data

Oct. 9, 1978 [JP] Japan .................................. 53/123569
Oct. 11, 1978 [JP] Japan .................................. 53/124099
Oct. 11, 1978 [JP] Japan .................................. 53/124100
Oct. 30, 1978 [JP] Japan .................................. 53/132503

[51] Int. Cl.$^3$ ............................................. C08L 91/00
[52] U.S. Cl. ................................. 260/28 R; 260/22 R; 260/22 EP; 260/22 A; 260/45.7 P; 260/45.7 PH; 260/45.95 R; 260/45.95 D
[58] Field of Search ......... 260/28 R, 45.7 PH, 45.7 P, 260/45.95 R, 45.95 D, 22 R, 22 EP, 22 A

[56] References Cited

U.S. PATENT DOCUMENTS

| 3,583,935 | 6/1971 | Weissermel et al. ................. 260/28 |
| 3,619,267 | 11/1971 | Weissermel et al. ................. 260/28 |

FOREIGN PATENT DOCUMENTS 1249252 10/1971 United Kingdom .

*Primary Examiner*—Melvyn I. Marquis
*Attorney, Agent, or Firm*—Sherman & Shalloway

[57] ABSTRACT

A glass fiber-reinforced thermoplastic polyester composition comprising
(A) 100 parts by weight of polyethylene terephthalate having an intrinsic viscosity, measured at 35° C. in ortho-chlorophenol, of from 0.4 to 0.9,
(B) from 0.05 to 3 parts by weight of a salt of montan wax,
(C) from 5 to 200 parts by weight of glass fibers having an average length of at least 0.2 mm, and
(D) from 0 to 5 parts by weight of an epoxy compound having at least two epoxy groups in the molecule.

11 Claims, No Drawings

GLASS FIBER-REINFORCED THERMOPLASTIC POLYESTER COMPOSITION

This invention relates to a thermoplastic polyester composition, and specifically, to an improved glass fiber-reinforced thermoplastic polyester composition which is advantageously free from many troubles associated with glass fiber reinforcement and which has excellent moldability to give molded articles having excellent and uniform quality, and excellent surface properties.

More specifically, this invention pertains to a glass fiber-reinforced thermoplastic polyester composition comprising (A) 100 parts by weight of polyethylene terephthalate having an intrinsic viscosity, measured at 35° C. in ortho-chlorophenol, of 0.4 to 0.9, (B) 0.05 to 3 parts by weight of a salt of montan wax, (C) 5 to 200 parts by weight of glass fibers having an average length of at least 0.2 mm, and (D) 0 to 5 parts by weight of an epoxy compound having at least two epoxy groups in the molecule.

As required, the aforesaid composition may further include at least one additive selected from the group consisting of coloration inhibitors, nucleating agents, coloring agents, stabilizers, fire retardants, ultraviolet absorbers, antioxidants, lubricants, fillers and antistatic agents.

Linear saturated polyesters such as polyethylene terephthalate having long gained commercial acceptance as fibers, films, engineering plastics, etc. because of their excellent physical and chemical properties, and in recent years, their development as engineering plastics has attracted special attention. The inherent properties of the linear saturated polyesters, however, are not sufficient for engineering plastics, and various improvements have been made to make them suitable as engineering plastics. It is known, for example, that a nucleating agent such as a particulate solid inorganic or organic substance is mixed with a linear saturated polyester derived from terephthalic acid in order to increase its rate of crystallization in a mold, thereby increasing the density of a molded article prepared from it and improving the dimensional stability of the molded article at high temperatures, and to shorten the molding cycle thereby increasing productivity. Inorganic substances known to be effective as such a nucleating agent include fine particles of metal oxides, alkaline earth metal salts, talc powder, glass powder, and metal powders having a particle diameter of not more than 5 microns. Known organic nucleating agents include metal salts of long-chain paraffins or higher fatty acid esters such as stearic acid, behenic acid and montanic acid.

With a view to increasing the rate of crystallization of a polyester and shortening the injection cycle, British Pat. No. 1,249,252 (published on Oct. 13, 1971) discloses granules of a composition comprising (a) a linear saturated polyester, (b) from 0 to 3%, calculated on the weight of the polyester, of an inert solid inorganic substance having a particle size of less than 5 microns, (c) from 0 to 2%, calculated on the weight of the polyester, of a polyfunctional epoxy compound, and (d) from 0 to 1.5%, calculated on the weight of the polyester, of a neutral or partially neutralized salt of montan wax or of a montan wax ester; said granules having a moisture content of less than 0.01% by weight and a reduced viscosity, measured with a 1% solution in a 60:40 mixture of phenol and tetrachloroethane at 25° C., of at least 1.25 dl/g, and said granules having been coated with from 0.01 to 1% by weight, calculated on the weight of the polyester, of a neutral or partially neutralized salt of montan wax or of a montan wax ester.

The above British patent does not at all state the incorporation of glass fibers and other reinforcing materials and technical troubles which may arise at the time of incorporating these materials.

Incorporation of glass fibers is known to improve the mechanical and other physical properties of polyethylene terephthalate. This method has the advantage of also improving the thermal properties of the polyester composition. The glass fiber-reinforced thermoplastic polyester composition, however, poses different technical problems from those encountered in polyethylene terephthalate not reinforced with glass fibers. One typical trouble is the extremely reduced moldability of the polyester composition which is caused as a result of reinforcement with glass fibers. For example, when a glass fiber-reinforced thermoplastic polyester composition is to be injection molded, the composition fed into a hopper of an injection molding machine does not go smoothly and uniformly into screw channels of the injection molding machine, and consequently, its metering becomes markedly unstable. This causes an increased frequency of forming molded articles with short shots, and the composition becomes a molding material having "poor feedability". This defect can be remedied to some extent by changing the shape of the screw or hopper or the size and shape of the molten material. However, intrinsically, this trouble is not easy to remove because the difference in shrinkage between the polyester and the glass fibers in the composition causes marked unevenness on the surface of the composition, and leads to the exposure of the glass fibers on the cut surface of the composition, and slippage between the pellets of the molding material is reduced.

Another problem is that polyethylene terephthalate having a relatively high intrinsic viscosity is difficult to utilize. Generally, the degree of polymerization of polyethylene terephthalate not reinforced with glass fibers must be increased as much as possible because its mechanical and other physical properties are markedly affected by its degree of polymerization. Thus, it is believed in the art that the intrinsic viscosity of polyethylene terephthalate should be at least 0.9, especially at least 1. However, when the intrinsic viscosity of the polyester is very high in the glass fiber-reinforced thermoplastic polyester composition, the melt viscosity of the composition becomes high, and the impregnability of the polyester in glass fibers is poor. As a result, the dispersibility of the glass fibers in the polyester is reduced to afford a non-homogeneous molding material. Therefore, the mechanical and thermal properties of molded articles prepared from this molding material are deteriorated, and variations may occur in these properties to such an extent that in certain applications, the molded articles will be useless.

Still another problem is the occurrence of clouding on the surface of molded articles, which defect is associated with the selection for the purpose of incorporating glass fibers of polyethylene terephthalate having a lower intrinsic viscosity than that of polyethylene terephthalate not reinforced with glass fibers. This phenomenon is pronounced with a glass fiber-reinforced polyethylene terephthalate composition, and is presumed to be attributed to oligomers of the polyester. It is presumed that the oligomers come onto the surface of the mold during the solidification-crystallization of the composition in the mold, and cause clouding of the surfaces of the molded article and the mold. When a composition of polyethylene terephthalate is to be molded, the temperature of the mold is heated in advance to 120° to 150° C. in order to accelerate its crystallization during molding. Thus, the clouding phenomenon is especially marked with the polyethylene terephthalate composition. The phenomenon impairs the appearance of the molding products and markedly reduces their merchandise values.

The degree of the clouding phenomenon increases with decreasing degrees of polymerization of the polyester. Since a polyester having a sufficiently high intrinsic viscosity is difficult to use in a glass fiber-reinforced polyester composition as stated hereinabove, this clouding phenomenon increases particularly with glass fiber-reinforced thermoplastic polyesters.

The present inventors have made extensive investigations in order to provide a glass fiber-reinforced thermoplastic polyester composition which can advantageously eliminate the new troubles not seen in polyesters which are not reinforced with glass fibers, e.g. the reduced moldability, the restrictions on the use of a polyester having a sufficiently high intrinsic viscosity, and the occurrence of the clouding phenomenon. These investigations have led to the discovery that by incorporating a small amount of a salt of montan wax to a glass fiber-reinforced thermoplastic polyester composition, the poor moldability of the composition caused by the incorporation of glass fibers can be improved markedly, and the problem of the clouding phenomenon attributed to the use of polyethylene terephthalate having a lower intrinsic viscosity can be conveniently avoided. It has also been found that by incorporating into the above composition up to 5 parts by weight, per 100 parts by weight of the polyester, of an epoxy compound having at least two epoxy groups in the molecule, mold flashes, which occur especially frequently with glass fiber-reinforced thermoplastic polyester compositions, can be markedly reduced, and the strength of molded articles from the composition can also be improved. The inventors have also discovered that the strength of the resulting molded articles can be further increased by coating the surfaces of the glass fibers with the aforesaid epoxy compound prior to incorporation into the polyester composition, and that especially good results can be obtained by uniformly mixing the salt of montan wax with glass fibers, nucleating agents, etc. to form a molding composition which is to be fed into a hopper of an extruder for making pellets.

It is an object of this invention therefore to provide a glass fiber-reinforced thermoplastic polyester composition which can advantageously overcome the various technical disadvantages described hereinabove.

The above and other objects and advantages of this invention will become more apparent from the following description.

The polyester used in the composition of this invention is polyethylene terephthalate having an intrinsic viscosity, measured at 35° C. in ortho-chlorophenol, of from 0.4 to 0.9. The polyethylene terephthalate is well known, and can be derived from terephthalic acid or its ester-forming derivative and ethylene glycol or its ester-forming derivative. It includes not only polyethylene terephthalate, but also copolyesters consisting of at least 90 mole% of terephthalic acid or its ester-forming derivative and ethylene glycol or its ester-forming derivative and the remainder being a $C_3$–$C_6$ glycol such as propylene glycol, hexamethylene glycol or tetramethylene glycol and/or a dicarboxylic acid component such as isophthalic acid or naphthalene-2,6-dicarboxylic acid.

The polyethylene terephthalate (A) used in the composition of this invention has an intrinsic viscosity $[\eta]$, measured at 35° C. in ortho-chlorophenol, of 0.4 to 0.9, preferably 0.45 to 0.8. The intrinsic viscosity of 0.9 corresponds to a reduced viscosity of about 1.17 specified in the above-cited British Patent, and the intrinsic viscosity of 0.8 corresponds to a reduced viscosity of 1.04. The use of polyethylene terephthalate having a lower intrinsic viscosity than the specified limit gives a composition showing unsatisfactory mechanical strength and thermal properties, and the use of polyethylene terephthalate having a higher intrinsic viscosity than the specified limit undesirably increases the melt viscosity of the resulting composition and deteriorates moldability and other properties. Accordingly, the intrinsic viscosity of the polyethylene terephthalate should be within the specified range.

The salt of montan wax in an amount of 0.05 to 3 parts by weight per 100 parts by weight of the polyethylene terephthalate (A) is another essential component of the composition of this invention. The salt of montan wax is well known, and as is described in the above-cited British Pat. No. 1,249,852, it is a neutral or partially neutralized salt of montan wax or of a montan wax ester. The salt of montan wax is a metal salt produced from an acid mixture consisting essentially of aliphatic monocarboxylic acids containing 26 to 32 carbon atoms in the chain (to be referred to as montanic acid). Suitable montan wax salts contain at least one metal of Groups I to III of the periodic table such as lithium, sodium, potassium, barium, magnesium, calcium and aluminum as a cation. The sodium salt of montanic acid is especially preferred.

The neutral or partially neutralized montan wax salt is produced by reacting the aliphatic monocarboxylic acid mixture described above with 0.2 to 1 equivalent of a hydroxide or oxide of the above metal. In particular, sodium montanate prepared by reaction with a solution of sodium hydroxide is preferred.

The montan wax ester salt is obtained by esterifying montanic acid partially with not more than 0.9, especially 0.5 to 0.8, equivalent of the dihydric alcohol having 2 to 4 carbon atoms in the alkylene group, and then neutralizing the esterification product with an oxide or hydroxide of the aforesaid metal. Examples of the dihydric alcohol to be used for esterification include ethylene glycol, 1,2-propanediol, 1,3-propanediol, 1,3-butanediol and 1,4-butanediol.

In the present invention, the term "salt of montan wax" is meant to include both a salt of montan wax and a salt of a montan wax ester.

The salt of montan wax (B) is used in an amount of 0.05 to 3 parts by weight, preferably 0.1 to 2 parts by weight, more preferably 0.2 to 1.5 parts by weight, per 100 parts by weight of the polyethylene terephthalate (A). If the amount of the salt of montan wax is smaller than the specified limit, the effect of removing the aforesaid troubles of polyethylene terephthalate containing glass fibers is insufficient, and no satisfactory improvement can be achieved with regard to moldability and surface clouding. On the other hand, if the amount of the montan wax salt (B) is more than the specified limit, the clouding phenomenon can be reduced to the same extent as in the case of using the montan wax (B) in amounts within the specified range, but the moldability of the resulting composition will be reduced.

Still another essential ingredient of the composition of this invention is (C) glass fibers having an average length of at least 0.2 mm in an amount of 5 to 200 parts by weight per 100 parts by weight of the polyethylene terephthalate (A).

All glass fibers available commercially for resin reinforcement can be used as the glass fibers (C). The average length (measured by the method to be described hereinbelow) is at least 0.2 mm, for example about 0.2 to 10 mm. When the average length is less than 0.2 mm and the proportion of finer glass fibers increases, the mechanical strength, especially impact strength, of molded articles prepared from the resulting composition is reduced extremely, and their heat distortion temperature also decreases. The diameter (measured by the method to be described hereinbelow) of the glass fibers can be properly selected, and is, for example, about 8 to 20 microns on an average.

The suitable amount of the glass fibers (C) is 5 to 200 parts by weight per 100 parts by weight of the polyethylene terephthalate (A). If the amount of the glass fibers is smaller than the specified limit, the heat distortion temperature and surface hardness of a molded article prepared from the resulting resin composition are reduced. If it exceeds the specified limit, the resulting composition is difficult to mold.

The glass fibers (C) may be surface-coated with an epoxy compound having at least two epoxy groups in the molecule, and this is preferable in order to increase the mechanical strength of the composition of this invention further. Examples of the surface-coating epoxy compound include bisphenol A-type epoxy compound (the average degree of polymerization: not more than 20, preferably not more than 15) obtained by reacting bisphenol A with epichlorohydrin, bisphenol F-type epoxy compound (the average degree of polymerization not more than 20, preferably not more than 15) obtained by reacting 4,4'-dihydroxydiphenylmethane with epichlorohydrin, poly(alkylene ether glycol diglycidyl ethers) such as polyethylene glycol diglycidyl ether or polypropylene glycol diglycidyl ether, alkylene glycol diglycidyl ethers such as ethylene glycol diglycidyl ether or butanediol-1,4-diglycidyl ether, sorbitol polyglycidyl ether, glycerol polyglycidyl ether, diglycerol polyglycidyl ether, vinyl cyclohexane dioxide, dicyclopentadiene dioxide, 3,4-epoxy-6-methylcyclohexylmethyl-3,4-epoxy-6-methylcyclohexane carbonate, and a novolac-type epoxy compound derived from a novolac resin and epichlorohydrin. These epoxy compounds can be used either alone or in combination with one another.

The amount of the surface-coating epoxy compound can be selected as desired. It is preferably 0.1 to 10% by weight, more preferably 0.1 to 5% by weight, based on the weight of the glass fibers (C). The surface coating means can be properly selected. The most preferred means is to use the aforesaid epoxy compound as a part or the whole of a coupling agent in the manufacture of glass fibers. At this time, another resin having good film-forming ability such as polyvinyl chloride is preferably used together. When the coated surfaces of glass fibers become tacky because of the use of a relatively large amount of a liquid epoxy compound, the handling of the glass fibers can be made easy by, for example, coating both the epoxy compound and a curing agent of the acid anhydride or amine type, and then subjecting the coated glass fibers to a moderate heat-treatment to prevent tackiness.

Of course, it is possible to use various coupling agents together with these polyfunctional epoxy compounds.

The glass fiber-reinforced thermoplastic polyester composition of this invention may further include (D) an epoxy compound having at least two epoxy groups in the molecule in an amount of up to 5 parts by weight per 100 parts by weight of the polyethylene terephthalate (A), and this brings about favorable results. The epoxy compound (D) may be used in an amount of, for example, 0.05 to 5 parts by weight per 100 parts by weight of the polyethylene terephthalate (A). Incorporation of the epoxy compound (D) serves to prevent flashes that may form along the parting line of a mold during the molding of the resulting composition, and also to increase the mechanical strength of the molded articles.

Examples of the epoxy compound (D) include bisphenol A-type epoxy compound (the average degree of polymerization not more than 20, preferably not more than 15) obtained by reacting bisphenol A with epichlorohydrin; novolac-type epoxy compound (the average degree of polymerization not more than 20, preferably not more than 15) obtained from a novolac resin and epichlorohydrin; an aromatic carboxylic acid-type epoxy compound (the degree of polymerization not more than 20, preferably not more than 15) obtained from an aromatic carboxylic acid and epichlorohydrin; alicyclic compound-type epoxy compounds obtained from alicyclic compounds such as cyclohexane, dicyclopentadiene and cyclopentadiene; a glycidyl ether of low-molecular-weight polyethylene glycol. Of these, diepoxy compounds are preferred. Especially preferred compounds are the bisphenol A-type compound and the diglycidyl ether of polyethylene glycol of low molecular weight (174).

If the amount of the epoxy compound (D) is less than the specified limit, the flowability of the composition in the molten state is reduced, and the appearance and physical properties of a molded article prepared from the resulting composition tend also to be adversely affected. Hence, it is preferred to use the epoxy compound (D) in an amount of up to 5 parts by weight per 100 parts by weight of the polyethylene terephthalate (A).

The glass fiber-reinforced thermoplastic polyester composition of this invention may further contain at least one additive selected from the group consisting of nucleating agents, coloring agents, fire retardants, ultraviolet absorbers, antioxidants, lubricants, coloration inhibitors, fillers and antistatic agents. Examples of nucleating agents are powders of inorganic substances such as talc, clay, $SiO_2$, $Al_2O_3$, $TiO_2$, graphite, $CaCO_3$, $MgCO_3$, ZnO and aluminum silicate, and organic substances such as salts of oxalic acid, stearic acid and benzoic acid. The amounts of the nucleating agent is properly chosen. For example, it can be about 0.01 to about 5% by weight based on the weight of the polyethylene terephthalate. Preferably, the nucleating agents have an average particle diameter of not more than 20 microns, especially not more than 5 microns.

Examples of coloring agents are dyes such as azo types and anthraquinone dyes, organic pigments such as azo pigments, phthalocyanine pigments and quinacridone pigments, and inorganic pigments such as titanium oxide, carbon black, red iron oxide and cadmium sulfide. The amount of coloring agents used is selected properly. For example, it is about 0.01 to about 5% by weight, preferably about 0.05 to about 2% by weight, based on the weight of the polyethylene terephthalate.

Examples of fire retardants include halogen-containing compounds such as brominated biphenyl ether, polycarbonate produced from a ring-brominated product of bisphenol A, elemental phosphorus, phosphorus compounds such as triphenyl phosphate, and compounds having a phosphorus-nitrogen bond such as phosphoramide. The amount of the fire retardant used is selected properly. For example, it is about 0.5 to about 50% by weight, preferably about 3 to about 25% by weight, based on the weight of the polyethylene terephthalate.

Examples of ultraviolet absorbers include benzophenone compounds such as 2-hydroxy-4-methoxybenzophenone, benzotriazole compounds such as (2-hydroxy-5-methylphenyl)benzotriazole, and salicylate compounds such as phenyl salicylate. The amount of the ultraviolet absorber is properly chosen. For example, it is about 0.01 to about 2% by weight, preferably about 0.05 to about 1% by weight, based on the weight of the polyethylene terephthalate.

Examples of the antioxidant include hindered phenol compounds such as 2,4,6-tri-tert.butyl phenol, sulfur-containing compounds such as dilauryl thiodipropionate, and amine compounds such as phenyl-α-naphthylamine. The amount of the antioxidant is properly chosen. For example, it is about 0.01 to about 2% by weight, preferably about 0.05 to about 1% by weight, based on the weight of the polyethylene terephthalate.

Examples of lubricants include paraffin waxes such as liquid paraffin, fatty acids such as palmitic acid, fatty acid esters such as butyl stearate, and fatty acid metal salts such as sodium stearate. The amount of the lubricant is selected properly. For example, it is about 0.01 to about 2% by weight, preferably about 0.05 to about 1% by weight, based on the weight of the polyester.

In the composition of this invention, the use of the salt of montan wax [B] is essential. However, since this compound is likely to cause coloration in the molded articles, it is especially preferred to use a coloration inhibitor which is advantageous for inhibiting such coloration. Especially preferred coloration inhibitors for this purpose are (i) compounds having the formula

wherein R's are identical or different, and each represents a hydrogen atom, a monovalent hydrocarbon group and the group—OR' in which R' is a hydrogen atom or a monovalent hydrocarbon group, (ii) compounds of the following formula

wherein R is the same as defined above, and (iii) hindered phenol compounds. The amount of the coloration inhibitor is, for example, 0.01 to 2 parts by weight per 100 parts by weight of the polyethylene terephthalate.

In the above formulae, the monovalent hydrocarbon group for R preferably includes alkyl, aralkyl and aryl groups containing not more than 12 carbon atoms. Examples of the alkyl groups are methyl, ethyl, propyl, isopropyl, butyl, pentyl, hexyl, cyclohexyl, octyl, and decyl. Examples of the aryl groups include phenyl, naphthyl, methylphenyl, phenylphenyl and brominated phenyl. Benzyl is an example of the aralkyl group. Specific examples of the phosphorus compounds as coloration inhibitors include phosphoric acid, phosphoric acid esters such as trimethyl phosphate, methyldiethyl phosphate, triethyl phosphate, triisobutyl phosphate, tributyl phosphate and triphenyl phosphate, phosphorous acid, phosphorous acid esters such as trimethyl phosphite, triethyl phosphite, and triphenyl phosphite, phosphonic acid, phosphonic acid derivatives such as phenylphosphonic acid and phenyl phenylphosphonate, phosphinic acid, and phosphinic acid derivatives such as dimethylphosphinic acid. Of these, the phosphates such as trimethyl or triphenyl phosphate are especially preferred.

Examples of the hindered phenol compounds are 2,6-di-tert.butyl-p-cresol, 2,4,6-tri-tert.butylphenol, 1,3,5-trimethyl-2,4,6-tris(3,5-di-tert.butyl-4-hydroxybenzyl)benzene, n-octadecyl-3-(4'-hydroxy-3',5'-di-tert.butylphenyl)propionate, and tetrakis[methylene-3-(3,5-di-tert.butyl-4-hydroxyphenyl)propionate]methane. These phosphorus compounds and hindered phenol compounds may be used singly, but produce a better effect when used in combination with one another.

Examples of the fillers include fibrous fillers such as asbestos, carbon fibers, polyamide fibers, gypsum whiskers and potassium titanate whiskers, and non-fibrous fillers such as mica, clay, talc, calcium carbonate, silica, feldspar, calcium sulfate, titanium dioxide, graphite, carbon black, glass beads, glass flakes, ferrite, calcium sulfite and magnesium oxide. The amount of the filler is selected properly. For example, it is about 1 to about 80% by weight, preferably about 5 to about 50% by weight, based on the weight of the polyethylene terephthalate.

Examples of the antistatic agent include cationic surface active agents such as stearamidopropyl dimethyl-β-hydroxymethyl ammonium nitrate, anionic surface active agents such as alkylaryl sulfates, and nonionic surface active agents such as polyethylene oxide. The amount of the antistatic agent is selected properly. For example, it is about 0.01 to about 5% by weight, preferably about 0.05 to about 2% by weight, based on the weight of the polyethylene terephthalate.

If desired, the polyester composition of this invention may contain a small amount, for example, up to about 100 parts by weight of the polyethylene terephthalate of another resin including thermoplastic resins such as styrene resins, acrylic resins, polyethylene, polypropylene, fluorocarbon resins, polyamide resins, polycarbonate resins, and polysulfone, thermosetting resins such as phenolic resins, melamine resins, unsaturated polyester resins, silicone resins, and epoxy resins, and soft thermoplastic resins such as an ethylene/vinyl acetate copolymer, polyester elastomers, and an ethylene/propylene/diene terpolymer.

The glass fiber-reinforced thermoplastic polyester composition of this invention can be produced by blending as uniformly as possible the polyethylene terephthalate (A), the salt of montan wax (B), the glass fibers (C), and optionally the epoxy compound (D) and the additives.

Blending can be effected by any desired means. Usually, it is preferred to disperse these ingredients as uniformly as possible. All or some of the ingredients are preferably mixed simultaneously or separately by a blender, kneader, roll, extruder, or the like to make a uniform blend. The most common method is to melt-knead a previously dry-blended composition further in a heated extruder, extrude the uniform composition into a wire form, and cutting it to the desired length to form granules. The resulting molding composition is usually maintained in the fully dried state, and put into a hopper of a molding machine for molding.

Another method is to add and mix the other ingredients before, during or after polycondensation in the production of the polyethylene terephthalate (A).

The glass fibers may be dry-blended without being melt-kneaded with the other ingredients in an extruder in order to prevent excessive crushing of the glass fibers and improve their operability during the production of the composition. For example, the granular polyethylene terephthalate produced in an extruder and not containing glass fibers may be put into a hopper of a molding machine together with a predetermined amount of a chopped glass strand or with another thermoplastic resin prepared in advance and containing glass fibers in a large proportion. The neutral or partially neutralized salt of montan wax or of a montan wax ester is added at the time of melt-kneading the polyester together with the other ingredients in an extruder or the like to form granules of the polyester composition, or before the granulated polyester composition is put into a hopper of a molding machine in order to produce the aforesaid effect. Preferably, the salt of montan wax or its ester is contained or uniformly to the inside and/or surface of the composition. The preferred amount of the montan wax salt is not more than 3 parts by weight per 100 parts by weight of the polyethylene terephthalate (A). In one preferred embodiment of this invention, the montan wax salt and the solid inorganic nucleating agent having an average particle size of not more than 5 microns are put in predetermined amounts into a mixing device usually employed for uniform mixing of powders such as a V-type blender, a ribbon mixer, a Banbury-type kneader or a sigma blade-type kneader to secure uniform mixing between them. The suitable amount of the solid inorganic nucleating agent used at this time is at least 0.25% by weight based on the montan wax salt. If desired, some or all of the other ingredients may be put into the mixing device simultaneously or separately and mixed. The mixing is effected until the materials become uniform. The resulting mixture is taken out, and is put into a hopper of an extruder together with the remaining materials, and the whole mixture is then extruded.

In the above-mentioned embodiment in which a coating of the salt of montan wax (B) is also formed on the surface of the pellets of the molding composition, it is preferable to adhere up to 3 parts by weight, preferably 0.05 to 3 parts by weight, of the montan wax salt to the surface of the pellets after the pellet surfaces are wetted with 0.01 to 3 parts by weight, per 100 parts by weight of the polyester (A), of an inert organic liquid. Any inert organic liquid can be used which is flowable at room temperature, does not decompose or evaporate during molding, and does not markedly deteriorate the other materials in the composition. Preferred inert organic liquids are liquids having a viscosity of not more than 100 poises at 25° C. Specific examples of such liquids include phthalic acid esters such as dimethyl phthalate, diethyl phthalate, di-n-octyl-phthalate and diisodecyl phthalate; aromatic carboxylic acid esters such as trioctyl trimellitate, diethylene glycol dibenzoate and octyl hydroxybenzoate, aliphatic dibasic acid esters such as diisodecyl succinate, dioctyl azelate and dioctyl tetrahydrophthalate, fatty acid derivatives such as triacetin and tributyrin; phosphoric acid esters such as trioctyl phosphate and tricresyl phosphate; epoxy-type plasticizers such as epoxidized soybean oil and epoxidized linseed oil; various oils and fats such as camellia oil, seasame oil, linseed oil, manhaden oil, castor oil and liquid waxes such as arctic sperm oil; various mineral oils resulting from purification of petroleum fractions such as spindle oil, turbine oil, machine oil, motor oil, cylinder oil, and electrical insulating oils; various silicone oils obtained by the hydrolysis of dialkyldichlorosilanes. Of these, paraffins and silicone oils are especially preferred.

Uniform wetting of the surface of the granular polyester composition with the inert organic liquid can be effected by various methods. For example, there are available a method which comprises feeding a granular polyester into a ribbon mixer, and adding the inert organic liquid dropwise from above while mixing them; a method which comprises feeding both the granular polyester and the inert organic liquid into a V-type blender at the same time, and mixing them with each other; and a method which comprises arranging polyester granules in a monolayer on a belt conveyor and while slowly moving the conveyor, spraying the inert organic liquid uniformly onto the surface of the granules from nozzles of a spraying device provided above the conveyor belt, and then receiving the wetted granules in a receiver tank provided at the end portion of the belt conveyor.

The glass fiber-reinforced thermoplastic polyester composition of this invention may be in the form of molding granular materials such as molding pellets, and also in the form of shaped articles of the desired configurations. The molding can be performed by any known means such as injection molding and compression molding.

The molding temperature and the molding time can be properly chosen by the type of the composition, the type of the molding, etc. For example, in injection molding, the cylinder temperature is 250° to 300° C., the molding cycle is 15 to 120 seconds, and the injection pressure is 600 to 1400 kg/cm$^2$. The mold needs not to be particularly heated, but when molding is carried out in a mold heated in advance to 100° to 150° C., preferably 120° to 150° C., the rate of crystallization is promoted by the action of the montan wax salt, and a molded article which is homogeneous both inside and outside can be obtained.

The following examples illustrate the present invention more specifically.

The average length and diameter of glass fibers were determined by the following methods.

AVERAGE LENGTH

About 0.57 to 0.7 g of the pellets of the composition was dissolved in 100 ml of ortho-chlorophenol. Glass fibers which remained undissolved were separated by filtration, and used for length measurement.

Glass fibers arbitrarily separated from the starting glass fibers or pellets are placed on a slide glass, and photographed on a scale of 50× using a universal projector (Profile Projector 6CT-2: NIHON KOGAKU K.K.). The length of each of 1000 glass fibers was measured, and based on the measured values, a chart showing the distribution of fibers lengths on a scale of 0.02 mm as actual length was made. From this distribution chart, the product of each fiber length multiplied by the number of fibers having this length is determined and the resulting products for all fiber lengths are summed up and used as the denominator. On the other hand, the product of each fiber length multiplied by the number of fibers having this length is determined, and the resulting products for all fiber lengths are summed up and used as the numerator. Thus, the average fiber length can be calculated from the following equation.

$$\bar{x} = \frac{\sum_{i=1}^{n} (Li)^2 \cdot ni}{\sum_{i=1}^{n} Li \cdot ni}$$

wherein
$\bar{x}$ is the average fiber length,
Li is each fiber length, and
ni is the number of fibers which have the length Li.

FIBER DIAMETER

The diameter of glass fibers in the pellets can be measured from the 50× photograph mentioned above. Since it does not change by molding, it is equal to the diameter of the starting glass fiber.

The moldability, the degree of surface clouding, the occurrence of flashes, and strength were tested and evaluated as follows:

(i) Moldability

This property shows whether a molding material is fed smoothly and uniformly into screw channels, and is determined by the feeding time of the molding material and the weight of a molded article produced by injection molding.

The feeding time denotes the time which elapses from the feeding of the molding material from the hopper of an injection molding machine into the screw until it is transferred into the barrel by the screw. Shorter feeding times mean better feedability.

The weight of a molded article is measured by actual weighing. Smaller weights mean a larger degree of short shot.

In determining these properties, sample molding pellets were dried in hot air at 150° C. for 4 hours, and immediately then, molded into discs having a diameter of 50 mm and a thickness of 2 mm by a 5-ounce injection molding machine at a cylinder temperature of 275° C. and a mold temperature of 140° C. under an injection pressure of 800 kg/cm². The cooling time was 25 seconds, and the total cycle was 40 seconds.

The feeding times and the weights of molded articles were determined with regard to ten shots from the 11th shot to the 20th shot, and the averages of the feeding times (seconds) and of the weights (gr) were determined.

(ii) Degree of surface clouding

Discs having a diameter of 50 mm and a thickness of 2 mm obtained under the same molding conditions as in the determination of moldability (i) were tested for surface gloss.

In the continuous injection molding, the surface of the mold was wiped clean at every 5 shorts, and the difference in gloss between a product obtained by a shot immediately preceding the wiping of the mold surface and a product obtained in a shot immediately following the wiping was determined at an incidence angle of 60 degrees by using a color difference meter (NIPPON DENSHOKU KOGYO, Color Difference Meter 101D) in accordance with ASTM D523-53T. This operation was repeated five times, and the average of the resulting values was defined as the degree of surface clouding. Smaller degrees of surface clouding show better results, and for practical purposes, a degree of surface clouding of not more than 20 is preferred.

(iii) Occurrence of flashes

The same discs as used in evaluating moldability (i) were used, and their appearances were observed visually. The results were rated on the following scale.

X: Flashes observed on the entire periphery.
Δ: Flashes observed on the entire periphery although to a lesser extent than X.
○: Some flashes observed near the gate.
⊙: No flash observed.

(iv) Strength of a molded article

Sample molding pellets were dried in hot air at 150° C. for 4 hours, and immediately then, molded by a 5-ounce injection molding machine at a cylinder temperature of 270° C. and a mold temperature of 140° C. under an injection pressure of 1000 kg/cm². The cooling time was 25 seconds, and the total cycle was 40 seconds. Thus, ASTM test specimens were prepared. Using these specimens, the flexural strength was measured in accordance with ASTM D-790, and the tensile strength was measured in accordance with ASTM D-638.

EXAMPLES 1 TO 3 AND COMPARATIVE EXAMPLES 1 TO 7

In each run, polyethylene terephthalate dried at 120° C. for 5 hours was mixed with the other materials shown in Table 1 by a V-type blender in the proportions shown in Table 1.

The mixture was kneaded in the molten state in a 65 mm extruder at a cylinder temperature of 280° C. The thread extruded from the die was cooled and cut to form molding pellets.

The molding pellets were molded, and their moldability, and the appearances (surface clouding and flashes) and strengths of the molded articles were determined. The results are summarized in Table 1.

As is seen from the results given in Table 1, moldabilities of compositions containing polyethylene terephthalate having a high intrinsic viscosity in Comparative Examples 1 and 2 were good, and the appearances of the molded articles did not appreciably differ depending upon the presence or absence of sodium montanate. However, these molded articles did not show sufficient strength.

In Comparative Examples 3 and 4 in which the compositions used were obtained by incorporating glass fibers in the compositions of Comparative Examples 1 and 2, uniform kneading of materials for pellets was difficult, and glass fibers not impregnated with the resin came out onto the pellet surfaces. When these pellets were fed into an injection molding machine, the rotating torque of the screw became unusually high. Accordingly, the molding had to be stopped.

In Comparative Example 5 in which polyethylene terephthalate having a low intrinsic viscosity was used and glass fibers were also incorporated, the glass fibers on the surface of the pellets had a sufficient amount of the resin impregnated therein and showed a uniformly kneaded condition. However, the resulting composition had poor moldability. Occasionally, shortage of metering occurred to give products with short shot. As the molding was continued, the gloss of the surface of the molded articles became worse, and the surface of the mold became cloudy. To prevent it, it was necessary to wipe the mold surface clean with a cloth once in every three shots.

In Example 1, as is clear from comparison with Comparative Example 5, the moldability of the composition and the degree of surface clouding of the molded article were improved.

In Examples 2 and 3, the intrinsic viscosity of polyethylene terephthalate and the amount of glass fibers were changed within the ranges specified in this invention. The moldability of the composition and the degree of surface clouding of the molded products were improved by the incorporation of sodium montanate.

In Comparative Example 6, the amount of sodium montanate was smaller than the limit specified in this invention. The moldability of the composition was inferior, and a cloudy material adhered to the surface of the molded article.

In Comparative Example 7, the amount of sodium montanate was larger than the limit specified in this invention. Adhesion of a cloudy material to the molded product was not observed, but the moldability of the composition was very inferior.

TABLE 1

| Example (Ex.) or Comparative Example (CEx.) | Polyethylene terephthalate [η] | Polyethylene terephthalate Amount | Glass fibers (*1) | Talc | Sodium montanate (*2) | length of glass fibers (mm) |
|---|---|---|---|---|---|---|
| CEx. 1 | 1.10 | 100 | 0 | 1 | 0 | — |
| CEx. 2 | 1.10 | 100 | 0 | 1 | 0.3 | — |
| CEx. 3 | 1.10 | 100 | 40 | 1 | 0 | — |
| CEx. 4 | 1.10 | 100 | 40 | 1 | 0.3 | — |
| CEx. 5 | 0.62 | 100 | 40 | 1 | 0 | 0.32 |
| Ex. 1 | 0.62 | 100 | 40 | 1 | 0.3 | 0.36 |
| Ex. 2 | 0.78 | 100 | 25 | 0 | 0.4 | 0.38 |
| Ex. 3 | 0.59 | 100 | 50 | 0 | 0.5 | 0.33 |
| CEx. 6 | 0.62 | 100 | 40 | 0 | 0.03 | 0.33 |
| CEx. 7 | 0.62 | 100 | 40 | 0 | 4 | 0.32 |

(*1): A chopped strand having a fiber diameter of 10 microns and a fiber length of 3 mm treated with a vinyl acetate-type coupling agent.

(*2): Montanate salt (m.p. 178° C.) obtained by partially neutralizing montanic acid with 0.75 equivalent of sodium hydroxide.

| Example (Ex.) or Comparative Example (CEx.) | Moldability Feeding time (sec.) | Weight of the molded article (gr.) | Degree of surface clouding | Degree of flash formation | Flexural strength (kg/cm$^2$) | Tensile strength (kg/cm$^2$) |
|---|---|---|---|---|---|---|
| CEx. 1 | 8.0 | 8.1 | 7 | O | 1150 | 800 |
| CEx. 2 | 7.6 | 8.2 | 5 | O | 1160 | 780 |
| Cex. 3 | Molding stopped | — | — | — | — | — |
| CEx. 4 | Molding stopped | — | — | — | — | — |
| CEx. 5 | 15.7 | 8.2 | 63 | X | 1880 | 1310 |
| Ex. 1 | 7.8 | 9.8 | 7 | X | 1860 | 1320 |
| Ex. 2 | 7.6 | 9.4 | 3 | X | 1510 | 1120 |
| Ex. 3 | 7.6 | 10.2 | 6 | X | 1070 | 1490 |
| CEx. 6 | 10.5 | 8.8 | 37 | X | 1860 | 1290 |
| CEx. 7 | 23.2 | 7.6 | 4 | X | 1770 | 1240 |

EXAMPLES 4 TO 7

In each run, 40 parts by weight of a chopped strand (13 microns in fiber diameter and 3 mm in fiber length) of E glass fibers produced by using an emulsion of a bisphenol A-type epoxy compound (EPIKOTE 828, a tradename for a product of Shell Chemical Co.) as a coupling agent in each of the concentrations shown in Table 2 and 0.3 part by weight of sodium montanate having a melting point of 176° C. were added to 100 parts by weight of polyethylene terephthalate having an intrinsic viscosity of 0.62 which had been dried at 120° C. for 5 hours, and they were mixed for 3 minutes in a tumbler. The resulting mixture was kneaded in the molten state and extruded by using a 65 mm-extruder at a cylinder temperature of 280° C. The thread extruded from the die was cooled, and cut to form molding pellets. The moldability of the molding pellets and the appearance and strength of the molded article were measured. The results are summarized in Table 2.

It is seen from Table 2 that the strength of the molded article increased with an increase in the amount of the epoxy compound adhering to the glass fibers. The moldabilities and appearances of the compositions and products of these Examples were much the same.

TABLE 2

| | Amount (wt. %) of the epoxy compound adhered to the glass fibers | Average length of glass fibers in the pellets (mm) | Molding characteristics | | | Strength of the molded article | |
|---|---|---|---|---|---|---|---|
| | | | Moldability | | Degree of surface clouding of the molded article | | |
| Example | | | Feeding time (seconds) | Weight of the molded article (gr.) | | Flexural strength (kg/cm$^2$) | Tensile strength (kg/cm$^2$) |
| 4 | 0.3 | 0.36 | 7.8 | 9.6 | 6 | 1980 | 1360 |
| 5 | 0.6 | 0.32 | 7.6 | 9.8 | 7 | 2070 | 1420 |
| 6 | 1.6 | 0.38 | 7.9 | 9.7 | 8 | 2110 | 1440 |
| 7 | 2.8 | 0.41 | 8.2 | 9.6 | 5 | 2100 | 1460 |

EXAMPLES 8 TO 11

In each run, 40 parts by weight of a chopped strand of glass fibers (13 microns in diameter and 3 mm in length), 0.3 part by weight of sodium montanate having a melting point of 170° C., and 0.05, 0.5, 1.0 or 3.0 parts by weight of an epoxy compound (EPIKOTE 815, a tradename for a product of Shell Chemical Co.) were added to 100 parts by weight of polyethylene terephthalate having an intrinsic viscosity of 0.600 which had been dried at 120° C. for 5 hours. They were mixed in a tumbler, and then kneaded in the molten state and extruded by a 65 mm vent-fitted extruder at a cylinder temperature of 260° C. while forming a vacuum in it. The thread extruded from the die was cooled and cut to form molding pellets.

Using these pellets, the moldability of the pellets, the appearance and strength of the molded products were determined. The results are summarized in Table 3.

It is seen from the results of Table 3 that when sodium montanate was used in combination with the epoxy compound, the appearance of the molded article was improved with markedly reduced flash formation.

of the phosphorus compounds or hindered phenol compounds shown in Table 4 in the amounts indicated were added to 100 parts by weight of polyethylene terephthalate having an intrinsic viscosity of 0.85 which had been dried at 120° C. for 5 hours. They were kneaded in the molten state in a 65 mm extruder at 270° C. and extruded to form molding pellets. To 100 parts by weight of the pellets was added 0.3 part by weight of sodium montanate (montanate obtained by partial neutralization with 0.75 equivalent of sodium hydroxide) or calcium montanate (a salt of montanic acid obtained by esterifying montanic acid with 9.75 equivalent of 1,3-butanediol, and then neutralizing the ester with calcium oxide). The mixture was injection molded, and the moldability of the composition and the appearance of the molded product were obtained.

The same discs as the molded articles used to determine moldability were tested for colors by a Hunter's color meter, and L, a and b values were obtained. The results are also shown in Table 4.

It is seen from the results given in Table 4 that the compositions containing the phosphorus compound or hindered phenol compound had a smaller b value,

TABLE 3

| | Amount of sodium montanate (parts by weight) | Amount of the epoxy compound (parts by weight) | Average length of glass fibers (mm) | Molding characteristics | | Appearance of the molded article | | Strength of the molded article | |
|---|---|---|---|---|---|---|---|---|---|
| | | | | Moldability | | | | | |
| | | | | Feeding time (sec.) | Weight of the molded article (gr.) | Degree of surface clouding | Degree of flash formation | Flexural strength (kg/cm$^2$) | Tensile strength (kg/cm$^2$) |
| Example | | | | | | | | | |
| 8 | 0.3 | 0.05 | 0.35 | 7.5 | 9.7 | 8 | ○ | 1990 | 1350 |
| 9 | 0.3 | 0.5 | 0.35 | 7.7 | 9.8 | 7 | ⊚ | 2130 | 1420 |
| 10 | 0.3 | 1.0 | 0.36 | 7.5 | 9.9 | 8 | ⊚ | 2210 | 1510 |
| 11 | 0.3 | 3.0 | 0.34 | 7.6 | 9.7 | 6 | ⊚ | 2210 | 1480 |

EXAMPLES 12 TO 21

In each run, 30 parts by weight of glass fibers having a length of 6 mm and a diameter of 13 microns and each showing the superiority of color. The moldability of the composition and the appearance of the molded product were not deteriorated by the addition of the phosphorus compound or hindered phenol compound.

TABLE 4

| | Phosphorus compound or hindered phenol compound | | Amount of sodium montanate (parts) | Amount of calcium montanate (parts) | Average length of glass fibers (mm) |
|---|---|---|---|---|---|
| Example | Name | Amount (parts) | | | |
| 12 | — | — | — | 1.0 | 0.33 |
| 13 | — | — | 0.3 | — | 0.33 |
| 14 | Trimethyl phosphate | 0.1 | 0.3 | — | 0.34 |
| 15 | Triethyl phosphate | 0.2 | 0.3 | — | 0.35 |
| 16 | 2,6-di-tert.butyl-p-cresol | 0.4 | 0.3 | — | 0.37 |
| 17 | Trimethyl phosphate 2,6-di-tert.butyl-p-cresol | 0.2 | 0.3 | — | 0.35 |
| 18 | Diethyl 3,5-di-tert. | | | | |

TABLE 4-continued

| Example | | | Moldability | Degree of surface clouding of the molded article | Color values | | |
|---|---|---|---|---|---|---|---|
| | | | Feeding time (sec.) | Weight of the molded article (gr.) | | | |
| | butyl-4-hydroxy-benzyl phosphate | 0.2 | — | 1.0 | 0.37 | | |
| 19 | Triphenyl phosphate | 0.2 | 0.3 | — | 0.34 | | |
| 20 | Phosphorous acid | 0.05 | 0.3 | — | 0.35 | | |
| 21 | Triphenyl phosphine | 0.2 | 0.3 | — | 0.36 | | |

| Example | Feeding time (sec.) | Weight of the molded article (gr.) | Degree of surface clouding of the molded article | L | a | b |
|---|---|---|---|---|---|---|
| 12 | 7.8 | 9.3 | 11 | 76.4 | −1.3 | 8.7 |
| 13 | 7.4 | 9.6 | 9 | 77.2 | −1.2 | 7.5 |
| 14 | 7.4 | 9.3 | 7 | 78.1 | <1.3 | 5.4 |
| 15 | 7.8 | 9.5 | 10 | 79.8 | −1.1 | 6.6 |
| 16 | 7.6 | 9.6 | 10 | 77.1 | −1.0 | 6.7 |
| 17 | 7.5 | 9.5 | 8 | 78.8 | −1.4 | 5.0 |
| 18 | 7.6 | 9.5 | 12 | 78.7 | −1.2 | 5.1 |
| 19 | 7.4 | 9.6 | 7 | 77.2 | −1.3 | 6.1 |
| 20 | 7.5 | 9.4 | 10 | 79.8 | −1.2 | 5.2 |
| 21 | 7.8 | 9.5 | 9 | 76.7 | −1.0 | 6.5 |

What we claim is:

1. A glass fiber-reinforced thermoplastic polyester composition comprising
   (A) 100 parts by weight of polyethylene terephthalate having an intrinsic viscosity, measured at 35° C. in ortho-chlorophenol, of from 0.4 to 0.9,
   (B) from 0.05 to 3 parts by weight of a salt of montan wax,
   (C) from 5 to 200 parts by weight of glass fibers having an average length of at least 0.2 mm, and
   (D) from 0 to 5 parts by weight of an epoxy compound having at least two epoxy groups in the molecule.

2. The composition of claim 1 which further contains at least one additive selected from the group consisting of nucleating agents, coloring agents, stabilizers, fire retardants, ultraviolet absorbers, antioxidants, lubricants, coloration inhibitors, fillers and antistatic agents.

3. The composition of claim 1 which further contains a coloration inhibitor selected from the group consisting of (i) compounds of the formula

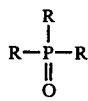

wherein R's are identical or different and each represents a hydrogen atom, a monovalent hydrocarbon group, or the group —OR′ in which R′ represents a hydrogen atom or a monovalent hydrocarbon group, (ii) compounds of the formula

wherein R is as defined, and (iii) hindered phenol compounds.

4. The composition of claim 1 wherein the glass fibers are surface-treated with an epoxy compound having at least two epoxy groups in the molecule.

5. The composition of claim 1 wherein the montan wax salt is selected from the group consisting of neutral salts of montan wax, partially neutralized salts of montax wax, and montan wax esters.

6. The composition of claim 1 wherein the montan wax salt contains at least one metal of groups I to III of the periodic table.

7. The composition of claim 6 wherein the metal is selected from the group consisting of lithium, sodium, potassium, barium, magnesium, calcium and aluminum.

8. The composition of claim 1 wherein the salt of montan wax is present in an amount of 0.1 to 2 parts by weight.

9. The composition of claim 1 wherein the glass fibers have an average length of from 0.2 to 10 mm.

10. The composition of claim 3 wherein the coloration inhibitor is present in an amount of 0.01 to 2 parts by weight.

11. The composition of claim 4 wherein the epoxy compound on the glass fibers are present in an amount of 0.1 to 10% by weight, based on the weight of the glass fibers.

* * * * *